US011489796B2

(12) United States Patent
Hewitt et al.

(10) Patent No.: US 11,489,796 B2
(45) Date of Patent: Nov. 1, 2022

(54) CONTENT RELEVANCE BASED ON DISCOURSE ATTACHMENT ARRANGEMENT

(71) Applicant: International Business Machines Corporation, Armonk, NY (US)

(72) Inventors: Trudy L. Hewitt, Cary, NC (US); Zachary A. Silverstein, Jacksonville, FL (US); Jonathan D. Dunne, Dungarvan (IE); Liam S. Harpur, Skerries (IE); Qi Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 16/703,277

(22) Filed: Dec. 4, 2019

(65) Prior Publication Data
US 2021/0174188 A1    Jun. 10, 2021

(51) Int. Cl.
*H04L 51/08* (2022.01)
*G06N 3/04* (2006.01)
(Continued)

(52) U.S. Cl.
CPC ............... *H04L 51/08* (2013.01); *G06F 8/71* (2013.01); *G06N 3/04* (2013.01); *G06N 3/08* (2013.01); *H04L 51/04* (2013.01)

(58) Field of Classification Search
CPC ..... H04L 51/04; H04L 51/043; H04L 51/046; H04L 51/08; G06Q 10/10; G06Q 10/101; (Continued)

(56) References Cited

U.S. PATENT DOCUMENTS 7,991,891 B2   8/2011  Kelly et al.
8,631,079 B2   1/2014  Affronti et al.
(Continued)

FOREIGN PATENT DOCUMENTS

JP    2014514676 A    6/2014

OTHER PUBLICATIONS

Van Gysel, Christophe, et al., Reply With: Proactive Recommendation of Email Attachments, CIKM '17: Proceedings of the 2017 ACM on Conference on Information and Knowledge Management, Nov. 2017, pp. 327-336, [retrieved on May 16, 2022], Retrieved from the Internet: <URL:http://dl.acm.org/>.*
(Continued)

*Primary Examiner* — Geoffrey R St Leger
(74) *Attorney, Agent, or Firm* — Garg Law Firm, PLLC; Rakesh Garg; Michael O'Keefe

(57) ABSTRACT

A computer-implemented method and system for arranging, in an ordered hierarchy, attached files as transferred during a discourse history. The computer implemented method includes accessing discourse data associated with a history of discourse communications. In embodiments, the discourse data includes a plurality of discourse attachments transferred in accordance with the history, and the discourse attachments include multiple versions of at least one discourse attachment within the plurality. The method further includes deriving a discourse attachment arrangement (DAA) component based at least in part on the discourse data. The method includes outputting, based at least in part on the DAA component, the multiple versions of the at least one discourse attachment arranged in a hierarchical order.

20 Claims, 9 Drawing Sheets

(51) Int. Cl.
    *G06N 3/08*     (2006.01)
    *H04L 51/04*     (2022.01)
    *G06F 8/71*     (2018.01)

(58) Field of Classification Search
    CPC ....... G06Q 10/103; G06F 8/71; G06F 40/197;
          G06F 16/148; G06F 16/90332; G06N
          3/02; G06N 3/04; G06N 3/08
    USPC ..................................... 717/120–122; 706/20
    See application file for complete search history.

(56) References Cited

U.S. PATENT DOCUMENTS

| | | |
|---|---|---|
| 8,745,045 B2 | 6/2014 | Bawri et al. |
| 9,298,783 B2 | 3/2016 | Brezina et al. |
| 9,384,224 B2 | 7/2016 | Patterson |
| 10,225,291 B2 | 3/2019 | Wilde et al. |
| 10,462,143 B1 * | 10/2019 | Pham .................... H04L 51/212 |
| 2002/0052898 A1 | 5/2002 | Schilit et al. |
| 2007/0226213 A1 | 9/2007 | Al-Masri |
| 2009/0319618 A1 * | 12/2009 | Affronti .................. H04L 51/08 |
| | | 707/999.2 |
| 2012/0284618 A1 | 11/2012 | Bailor et al. |
| 2018/0109574 A1 * | 4/2018 | Vigoda ................ G06Q 10/101 |

OTHER PUBLICATIONS ip.com, Method and system for email correlation notification, IP.com Disclosure No. IPCOM000222517D, Oct. 15, 2012.
ibm.com, AI for enterprise search, 2019, https://www.ibm.com/watson/ai-search.
ibm.com, IBM Rational Change, 2019, https://www.ibm.com/us-en/marketplace/rational-change.
ibm.com, IBM Rational ClearCase, 2019, https://www.ibm.com/us-en/marketplace/rational-clearcase.

* cited by examiner

*FIGURE 4*

CHAT HISTORY 401

QI LI 3.42PM
HEY GUYS, THIS IS THE 1ST VERSION OF z/OSMF CONFIG GUIDE, PLEASE REVIEW IT.
[2.3CONFIGGUIDE.PDF]

GUO QUING DENG 4.11PM
I'VE ADDED A NEW CHAPTER FOR TROUBLE SHOOTING, ANY COMMENTS?
[2.3CONFIGGUIDE.PDF]

QI LI 4.12PM
IT LOOKS GOOD.

WEI LIU 4.13PM
THE CHAPTER OF NETWORK CONFIGURATION IS CHANGED
[2.3CONFIGGUIDE.PDF]

GUO QING DENG 4.15PM
GUYS, I REMOVED THE TROUBLE SHOOTING CHAPTER, I WILL MOVE THIS PART TO OTHER BOOKS.
[2.3CONFIGGUIDE.PDF]

WEI LIU 4.17PM
I CORRECTED SOME DESCRIPTION OF THE PRODUCT OVERVIEW.
[2.3CONFIGGUIDE.PDF]

QI LI 4.25PM
I'D LIKE TO TAKE A LOOK AT THE TROUBLE SHOOTING CHAPTER, BUT I CAN'T FIND IT NOW.

ATTACHMENTS 402

GUO QUING DENG 4.11PM
I'VE ADDED A NEW CHAPTER FOR TROUBLE SHOOTING, ANY COMMENTS?

PDF ▶

2.3CONFIGGUIDE.PDF
4 MB PDF z/OS
IBM z/OS MANAGEMENT FACILITY CONFIGURATION GUIDE
VERSION 2 RELEASE 3

FILE CHANGE HISTORY 403 z/OS

IBM z/OS MANAGEMENT FACILITY CONFIGURATION GUIDE

VERSION 2 RELEASE 3

CHAPTER 13. TROUBLESHOOTING PROBLEMS

THIS CHAPTER PROVIDES TIPS AND TECHNIQUES FOR TROUBLESHOOTING COMMON PROBLEMS. INCLUDED ARE PROCEDURES AND METHODS FOR PERFORMING PROBLEM DETERMINATION AND FOR DETERMINING THE STATUS OF THE DIFFERENT COMPONENTS.

THIS CHAPTER IS ORGANISED INTO TOPICS, AS FOLLOWS:
1. "RESOURCES FOR TROUBLESHOOTING"
2. "TOOLS AND TECHNIQUES FOR TROUBLESHOOTING" ON PAGE 166
3. "COMMON PROBLEMS AND SCENARIOS" ON PAGE 178.

RESOURCES FOR TROUBLESHOOTING
...

INSTANT MESSAGING TOOLS
(SLACK, SAMETIME ETC....)

USER GROUP PROFILES 404

US 11,489,796 B2

CONTENT RELEVANCE BASED ON DISCOURSE ATTACHMENT ARRANGEMENT

TECHNICAL FIELD

The present invention relates generally to data processing systems, and more particularly, to content relevance based on discourse attachment arrangements.

BACKGROUND

Real-time chat programs and tools can be used to communicate in many different ways. From a cumulative history of a given chat discourse, content may be transferred, including file attachments, through multi-modal methods that include as images, video and sound files. Additionally, file attachments in an array of formats can be transferred during the discourse to an individual or to a group. Multiple file versions of a given content as attached may exist and may be transferred over a period of time. Due to the linear progression of events in chat or discourse history, for instance, using a mouse wheel to scroll back through time in the given discourse history, locating a specific or a distinct version of a file attachment can be time consuming. Oftentimes, an inordinate amount of time can be spent looking for the "right version" of a file, which may not necessarily be the latest or the one of most interest to a given user or a user group.

SUMMARY

The illustrative embodiments provide a method, system, and computer program product. An embodiment includes a computer-implemented method for arranging, in an ordered hierarchy, attached files as transferred during a discourse history. The computer implemented method includes accessing discourse data associated with a history of discourse communications. In embodiments, the discourse data includes a plurality of discourse attachments transferred in accordance with the discourse history, and the discourse attachments include multiple versions of at least one discourse attachment within the plurality. An embodiment further includes deriving a discourse attachment arrangement (DAA) component based at least in part on the discourse data. Another embodiment includes outputting, based at least in part on the DAA component, the multiple versions of the at least one discourse attachment arranged in a hierarchical order.

An embodiment includes a computer usable program product. The computer usable program product includes one or more computer-readable storage devices. Program instructions stored on at least one of the one or more storage devices are executable in one or more processors to provide for arranging, in an ordered hierarchy, attached files as transferred during a discourse history.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide for arranging, in an ordered hierarchy, attached files as transferred during a discourse history.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts an illustrative embodiment of discourse data associated with a history of discourse communications;

DETAILED DESCRIPTION

Figure 1:
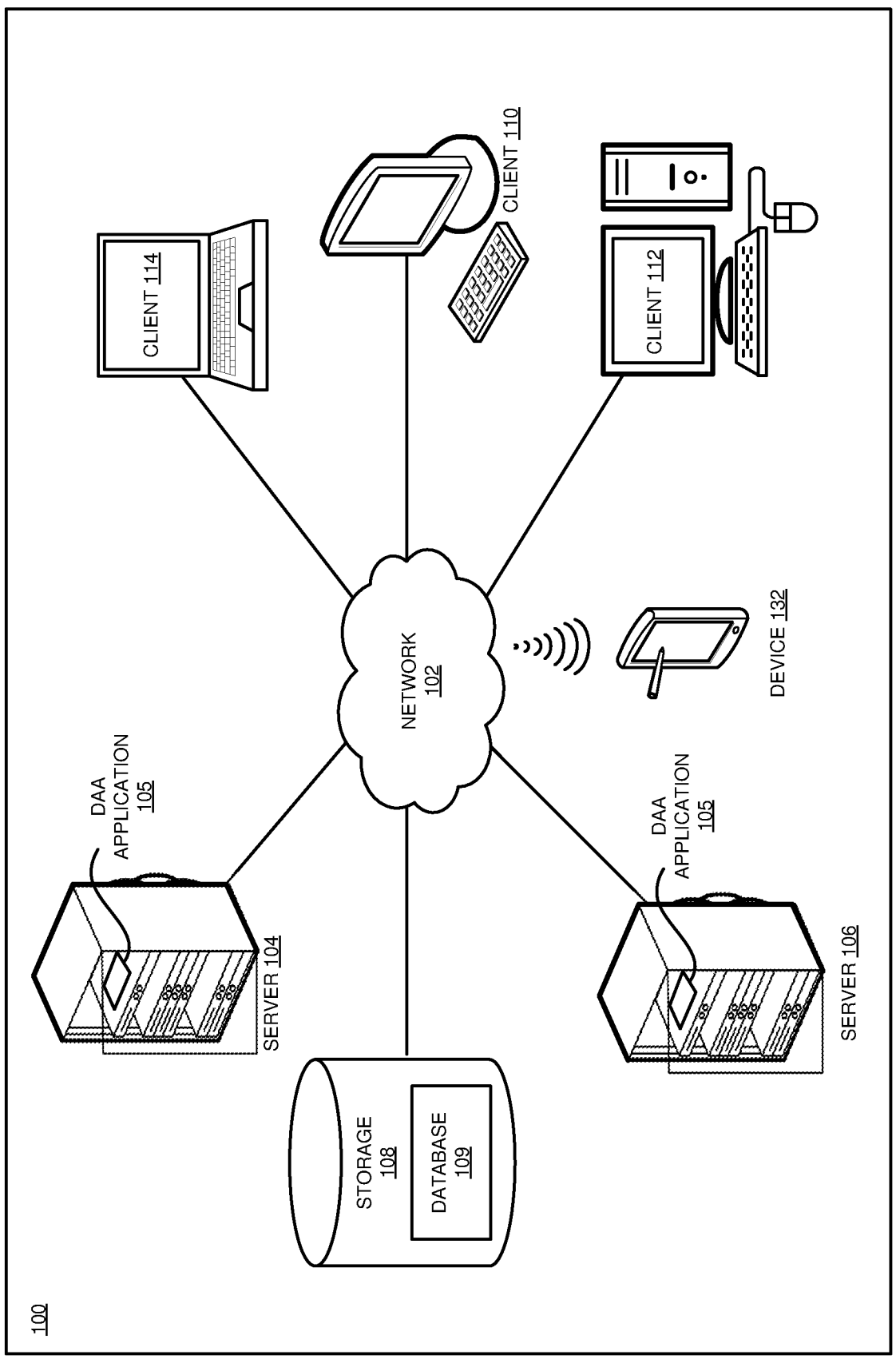
FIG. 1 depicts a block diagram of a network of data processing systems in which illustrative embodiments of a discourse attachment arrangement application are implemented.

The illustrative embodiments recognize that there is a need for providing a user or a given user group with solutions described herein that arrange and present, in a hierarchical manner, the version of a file likely to be most relevant to the user or group based on the prior chat discourse history and content transferred via file attachments.

Among other technical advantages and benefits, a user can be presented with a user interface in which the file versions are arranged in a hierarchical order likely to be of most interest or relevance to the user or user group. A discourse attachment arrangement (DAA) application, among other benefits described herein, implements identification of most relevant or most current file versions based on the discourse history. In embodiments, the DAA application provides a DAA component based on implementing an artificial neural network (ANN) model.

With further regard to existing solutions, quite often the file versions referred to and transferred during a discourse history may not be current or most likely to be of interest to a given user or user group. One of the problems with such an existing solution is that multiple files may be transferred over a period of time. For instance, due to the linear nature of event progressions in a given discourse or chat history, locating a specific or a distinct version of a file referred to or transferred during the discourse can be inordinately time consuming. Oftentimes, many minutes or hours can be spent looking for the "right version" of a file, which may not necessarily be the latest or the one likely to be most useful to the user. The term user group as used herein refers to a collection of individual users who have a common interest as evidenced by a chat or other discourse history in which they are engaged.

Embodiments herein eliminate or minimize the latter problems and provide a mechanism for simplifying the user experience by identifying file versions that are likely to be the most current or of most interest to users based on the discourse history. Embodiments presented herein advantageously also provide solutions for leveraging the DAA component implementation techniques across multiple discourse threads that span multiple domain channels. Embodiments herein provide solutions applicable for file version identification and file version control purposes.

The illustrative embodiments recognize that the presently available tools or solutions do not address these needs or provide adequate solutions for these needs. The illustrative embodiments used to describe the invention generally address and solve the above-described problems and other problems related to identifying and presenting, in an ordered arrangement, file attachment versions likely to be of most interest to users.

An embodiment can be implemented as a DAA application constituted of any combination of hardware and software program instructions. The DAA application implementing an embodiment can be configured as a modification of an existing server computing device or system, as a separate application that operates in conjunction with a server device, or some combination thereof.

A method of an embodiment described herein, when implemented to execute on a device or data processing system, comprises substantial advancement of the functionality of that device or data processing system tot arrange and present, in a hierarchical manner, the version of a file likely to be most relevant to the user or group based on the prior chat discourse history and content transferred via file attachments.

The illustrative embodiments are described with respect to DAA applications that are constituted of any combination of hardware and software program instructions, including DAA applications installed on server devices and systems, physical CPU cores, virtual CPU, server devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a DAA application at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
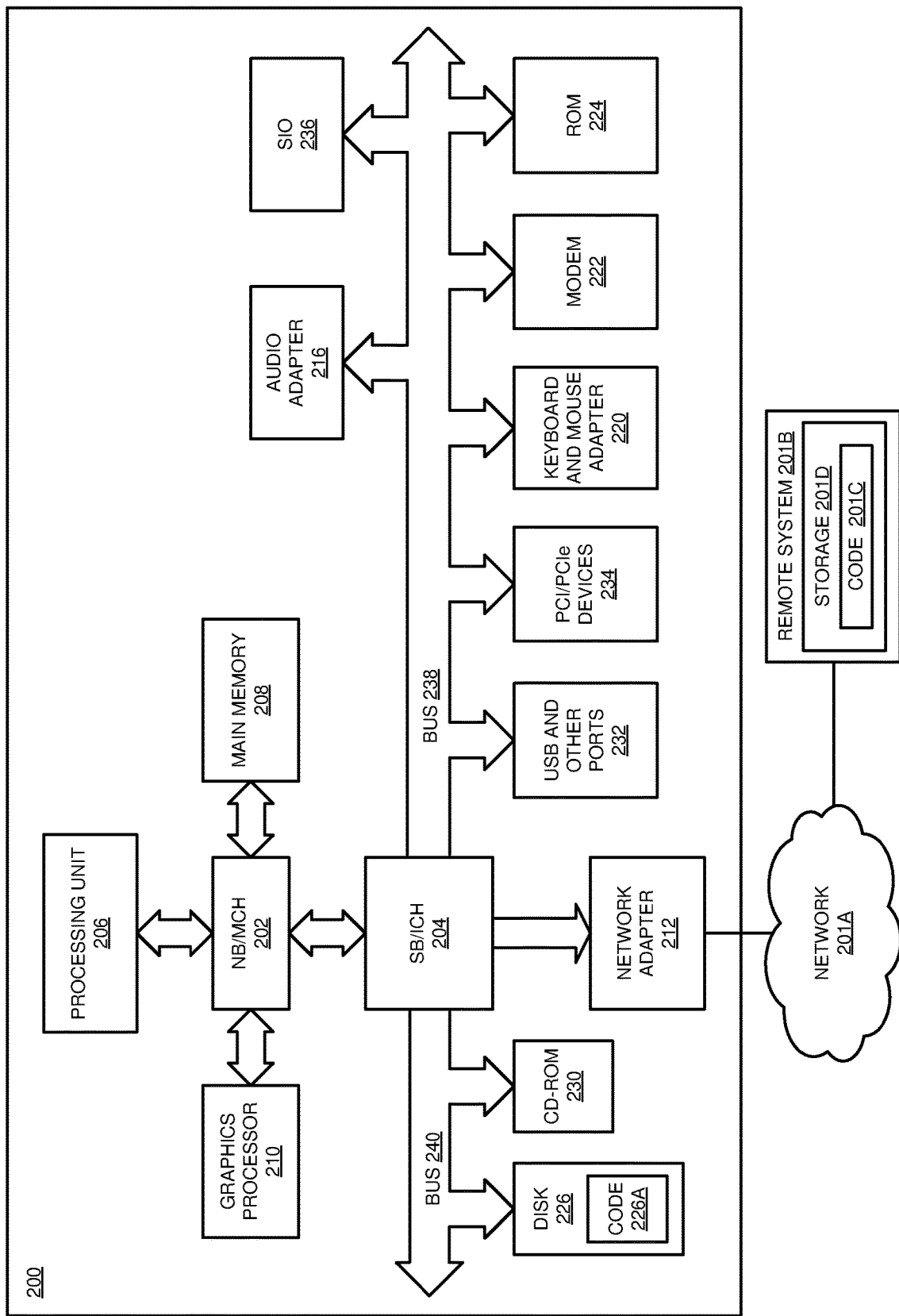
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments of a discourse attachment arrangement application are implemented. Data processing environment 100 is a network of computers in which the illustrative embodiments are implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 112, 114 are also coupled to network 102. A data processing system, such as server 104 or 106, or clients 112, 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

DAA application 105 implements an embodiment described herein. DAA application 105 can be comprised of any combination of hardware and software program instructions executable in one or more processors. DAA application 105 can execute in servers 104 and 106, storage unit 108, and clients 112, 114 coupled to network 102 using wired connections, wireless communication protocols, or other suitable data connectivity. Clients 112, 114 may be, for example, a portable personal computer.

In the depicted example, server 104 provides data, such as boot files, operating system images, and applications to clients 112, 114. Clients 112, 114 and devices 132, 134 may be clients to server 104 in this example. Clients 112, 114 as well as devices 132, 134 may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as DAA application 105 in FIG. 1 and application 302 in FIG. 3A, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
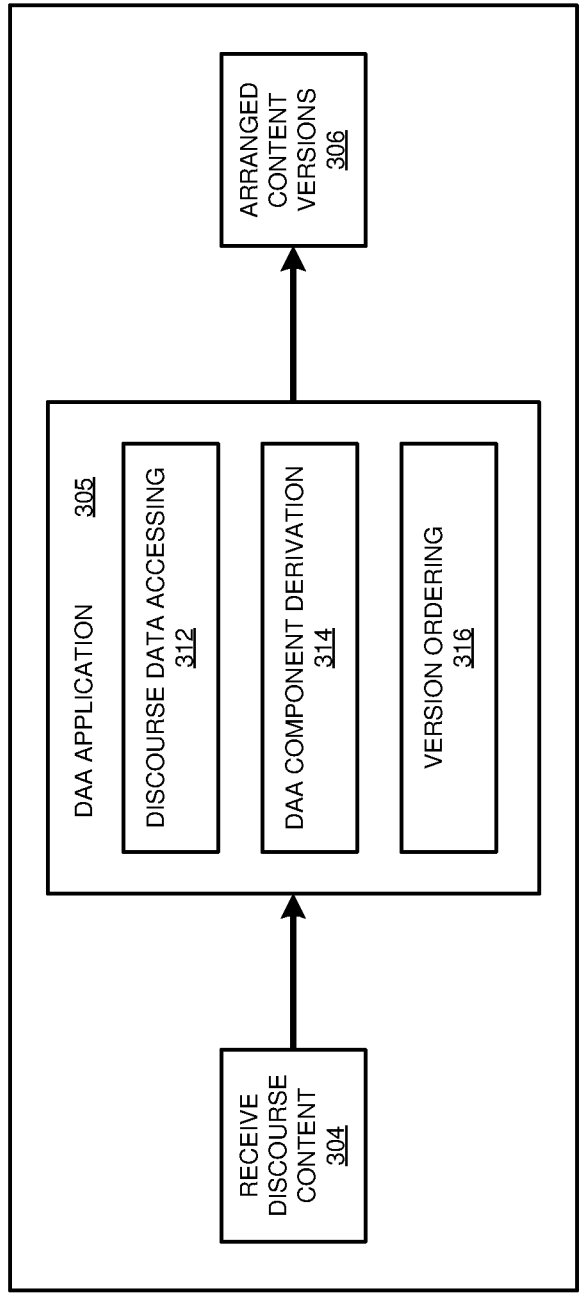
FIG. 3 depicts a block diagram of an example process for a discourse attachment arrangement application.

FIG. 3 depicts a block diagram of an example process for a discourse attachment arrangement application. In an embodiment in accordance with FIG. 3, DAA application 305, corresponding to DAA application 105 of the embodiment of FIG. 1, is installed on servers 104, 106. DAA application 105 includes any combination of executable program instructions and hardware to implement discourse data accessing functionality 312, DAA component derivation functionality 314 and version ordering functionality 316, for identifying and arranging, in an ordered hierarchy, attached files as transferred within the course of a discourse history. In some embodiments, DAA application 305 comprises program instructions stored on one or more storage devices of server 104, 106 for execution by one or more processors. DAA application 305 operates based at least in part on received discourse content 304 and generates arranged and hierarchically ordered content versions 306.

Embodiments herein eliminate the problems of the latter solution and provide a mechanism for efficiently arranging and presenting files transferred during a discourse history. In embodiments, such files may exist in accordance with multiple versions, and one or more of the versions referred to or transferred may not be the most up to date version in existence, nor a version likely to be of most interest to a user or a user group. Embodiments advantageously provide a user or a given user group with solutions described herein that arrange and present, in a hierarchical manner, the version of a file likely to be most relevant to the user or group based on the prior chat discourse history and content transferred via file attachments.

In accordance with embodiments described herein, among other technical advantages and benefits, a user can be presented with a user interface in which the file versions are arranged in a hierarchical order likely to be of most interest or relevance to the user or user group. Discourse attachment arrangement (DAA) application 305, among other benefits described herein, implements identification of most relevant or most current file versions based on the discourse history. In embodiments, the DAA application 305, based on input via received discourse content functionality 304, provides a DAA component derivation function 304 based on implementing, in an embodiment, an artificial neural network (ANN) model. The discourse history data may be associated with one or more user profiles, either individual users, a user group, or any combination thereof, that engage in the discourse chat or communications.

In embodiments, the hierarchical order of file versions transferred is based on a most current version of the multiple versions. The most current version is arranged in a highest position within the hierarchical order. Furthermore, the hierarchical order is rendered with regard to a particular user profile or a user group profile based on participation in the discourse history and file contents pertaining thereto.

In other embodiments, the discourse data is associated with more than one discourse channel domains, and the DAA component derived is leveraged across the multiple discourse channel domains.

In related embodiments, the DAA application 305 in conjunction with system 100 described could consider any file changes and version changes that were made contemporaneously that may potentially conflict, and refer to the chat discourse to determine a confidence ranking as to what version or versions should be maintained or prioritized based on the consensus of the users or a user group.

In other variations, DAA application 305 in conjunction with system 100 can also enable local system scanning to determine if a document or file is being currently worked on, but has not yet been uploaded, and provide a placeholder visual for updates that are in progress, akin to showing in a chat discourse that user is typing text before the text is sent. Yet further, DAA application 305 in conjunction with system 100 can dynamically redirect links, or recommend alternate links, if a link to a presentation is shared during chat discourse that is not the latest version. In additional example embodiments, DAA application 305 in conjunction with system 100 can generate a flag to inform a user of outer-channel modifications, so that user or viewer can prompt, in follow up, a given document poster for any other possible document versions.

In other related example embodiments, various user's comments and postings can have different placement in the hierarchical order based on a semantic role analysis as performed in conjunction with discourse data accessing functionality 312. In other embodiments, system 100 in conjunction with DAA application 300 can utilize a learning loop to improve upon itself via assisted manual training for the most optimum hierarchical view.

FIG. 4 depicts an illustrative embodiment of discourse data associated with a history of discourse communications. Chat, or discourse history 401 is associated with user group or user profiles 404 for participants, stored or accessed from system 100 and available to DAA application 305. Attachments 402, constituted of file, document or other content attachments in some embodiments, may be transferred and referred to among chat participants during the course of chat history 401. Attachments 402 are associated with file change history 403 stored in a database of system 100, or otherwise accessible to DAA application 305.

In example embodiments, file content attachments 402 transferred is analyzed in conjunction with chat discourse history 401 and user profiles 404. With regard to content of the files transferred, DAA application 305 pays particular attention with regard to the multiple versions of the files under the same topic in view of the file change history 403. The collected data is structured or filtered to remove the information which is not useful, paying particular attention to attachment versions and arrangement related data.

In one illustrative, the code implementation as follows shows a JSON message structure in conjunction with analytics.

```
chat discourse history: [
...
{
    "_id": "99c200cfc5b714a835e0",
    "content": "I've added a new chapter for trouble shooting, any comments?",
    "contentType": "text/html",
    "authorId": "56e0462f-9932d8c0-8d4de999",
    "deviceId": "6829fc22-b59803a1-2145d9d0",
    "chatGroupId": "35b210fc5ac453a910e3",
    "time": "2019-04-08T16:11:23.125Z",
    "topic_tags": ["add", "trouble shooting"]
},
...
{
    "_id": "91b211decb9324a94003",
    "content": "I'd like to take a look at the trouble shooting chapter, but I can't find it now.",
    "contentType": "text/html",
    "authorId": "77c5463e-8812d92b-6a6ee312",
    "deviceId": "738cc11-c65514aa-3342a0d8",
    "chatGroupId": "35b210fc5ac453a910e3",
    "time": "2019-04-12T16:25:15.422Z",
    "topic_terms": ["view", "trouble shooting"]
}
]
attachments: [
...
{
    "_id": "5ea865cc",
    "uploadTime": "2019-04-08T16:11:23.125Z",
    "fileName": "2.3configGuide.pdf",
    "version": "1.02",
    "chatId": "99c200cfc5b714a835e0"
},
...
]
users: [
...
{
    "_id": "56e0462f-9932d8c0-8d4de999",
    "name": "Guo Qing",
    "org": "system Z",
    "role": "z/OSMF squad member"
},
{
    "_id": "77c5463e-8812d92b-6a6ee312",
    "name": "Qi Li",
    "org": "system Z",
    "role": "z/OSMF squad owner"
},
...
]
```

Figure 5:
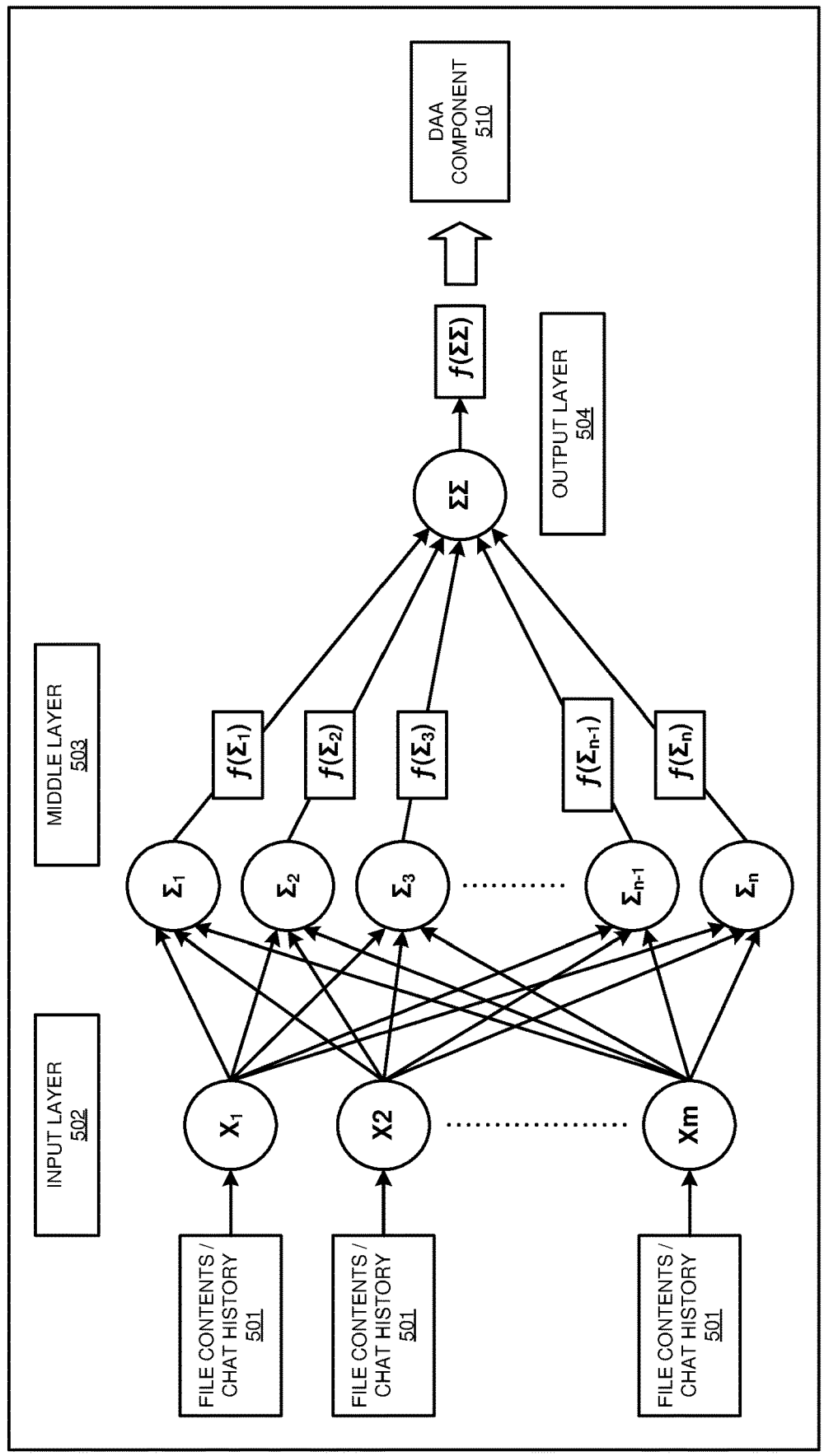
FIG. 5 depicts an illustrative embodiment of an artificial neural network implementation modeling a discourse attachment arrangement component based on discourse data associated with a history of discourse communications.

FIG. 5 depicts an illustrative embodiment of an artificial neural network implementation modeling a discourse attachment arrangement component based on discourse data associated with a history of discourse communications.

The data source is clipped, sampled, optimized using the neural network and trained the DAA component. In embodiments, deriving the DAA component is based on providing the plurality of discourse attachments to a corresponding plurality of input layers 502 of an artificial neural network (ANN) 500 implemented in one or more processors. The input layers 502 include extracted or filtered data 501 relating to file contents transferred during the course of the discourse history. The plurality of input layers 502 are interconnected with an output layer 504 of the ANN via a set of intermediate or middle layers 503. In embodiments, the neural network of FIG. 5 is used to model the real-time attachment order relating to the files and versions transferred. In the example ANN implementation, artificial neurons and connections typically have a weight associated with middle layers that adjusts as learning proceeds. The weight increases or decreases the strength of the signal at a connection between neurons. Different layers may perform different kinds of transformations on their inputs. Signals travel from the first (input) layer 502, to the last (output) layer 504, possibly after traversing the middle layers 503 multiple times.

The DAA component 510 is generated as a function of the output layer. In embodiments, the DAA component 510 derives the hierarchical order of the multiple versions of the transferred files of one or more discourse attachments.

An example embodiment of code implementation to derive the DAA component is as follows:

```
# model
def model(data, X_train, Y_train, X_test, Y_test, num_iterations = 2000, learning_rate = 0.5, print_cost = False):
    """
    Builds the logistic regression model
    Arguments:
        data -- text corpus
        X_train -- training set represented by a numpy array of message
        Y_train -- training labels represented by a numpy array (vector) of message
        X_test -- test set represented by a numpy array of message
        Y_test -- test labels represented by a numpy array (vector) of message
        num_iterations -- hyperparameter representing the number of iterations to optimize the parameters
        learning_rate -- hyperparameter representing the learning rate used in the update rule of optimize( )
        print_cost -- Set to true to print the cost every 100 iterations
```

```
Returns:
    d -- dictionary containing information about the model.
"""
# initialize parameters with zeros
w, b = initialize_with_zeros(X_train.topic[0])
# Gradient descent
parameters, grads, costs = optimize(w, b, data, X_train, Y_train,
num_iterations, learning_rate, print_cost = False)
# Retrieve parameters w and b from dictionary "parameters"
w = parameters["w"]
b = parameters["b"]
# Predict test/train set examples
Y_prediction_test = predict(w, b, data, X_test)
Y_prediction_train = predict(w, b, data, X_train)
# Print train/test Errors
print("train accuracy: { } %".format(100 -
np.mean(np.abs(Y_prediction_train - Y_train)) * 100))
print("test accuracy: { } %".format(100 -
np.mean(np.abs(Y_prediction_test - Y_test)) * 100))
d = {"costs": costs,
    "Y_prediction_test": Y_prediction_test,
    "Y_prediction_train" : Y_prediction_train,
    "w" : w,
    "b" : b,
    "learning_rate" : learning_rate,
    "num_iterations": num_iterations}
return d
```

Figure 6:
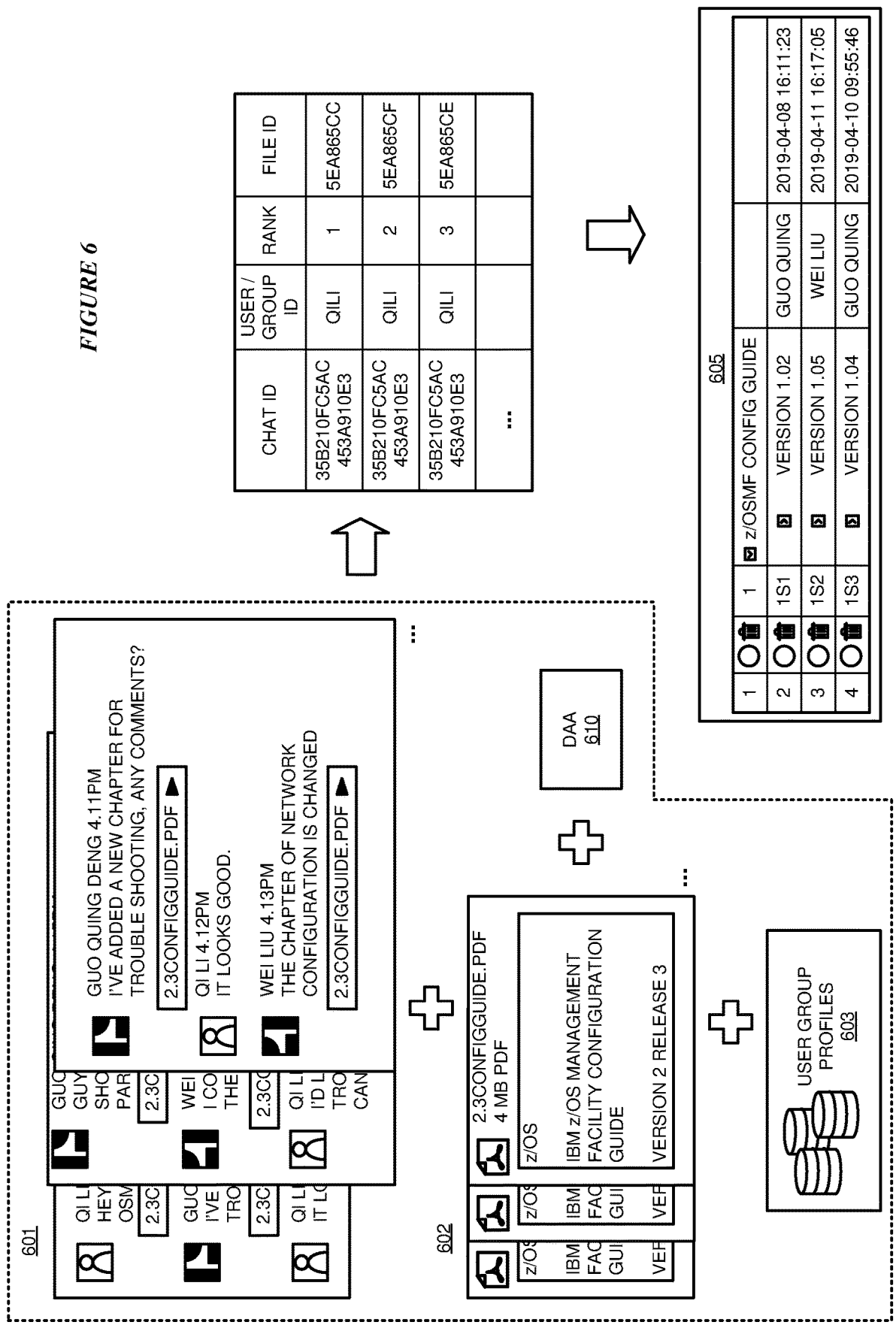
FIG. 6 depicts an illustrative embodiment of output generated in accordance with a discourse attachment arrangement component providing a hierarchically ordered arrangement of discourse attachments including multiple file versions.

FIG. 6 depicts an illustrative embodiment of output generated in accordance with a discourse attachment arrangement component providing a hierarchically ordered arrangement of discourse attachments including multiple file versions.

DAA application 305 operates in conjunction with data 601 of the chat discourse history, attachments file configuration 602, user group profiles 603 and DAA component 610 as derived in the example embodiment of FIG. 5 to provide hierarchically arranged file versions 605. In particular, the DAA component 610 is then used to arrange attachments of within a hierarchical graph. The output of the DAA component is used to determine the order of multiple versions of the attachments. The attachments can be arranged within a hierarchical graph so that the most relevant version of the attachments is ordered first. In some example embodiments, the attachments are arranged per different user or group as depicted in hierarchically arranged file versions 605 of FIG. 3.

In some code example embodiments, the functionality of DAA application 305 in the latter regard may be implemented as follows:

```
# predict
def predict(w, b, X):
    """
    Predict the attachment order using learned logistic
regression parameters (w, b)
    Arguments:
    w -- weights, a numpy array of size
    b -- bias, a scalar
    X -- data of size
    Returns:
    Y_prediction -- a numpy array (vector) containing all
predictions (0/1) for the examples in X
    """
    m = X.topic[1]
    Y_prediction = np.zeros((1,m))
    w = w.ratetopic(X.topic[0], 1)
    # Compute vector "A" predicting the confusion level
    ### START CODE HERE ###
    A = sigmoid(np.topic(w.T,X)+b)
    ### END CODE HERE ###
    for i in range(A.topic[1]):
        ### START CODE HERE ###
        Y_prediction[0,i]= A[0,i]
        ### END CODE HERE ###
    assert(Y_prediction.topic == (1, m))
    return Y_prediction
In [ ]:
currentVersionRank = lookupVersionRank(chatId, fileId, scope);
optimumVersionRank = event.getVersionRank( );
if currentVersionRank < optimumVersionRank :
daemon.changeVersionRank(chatId, fileId, event.getVersionRank( ));
```

Figure 7:
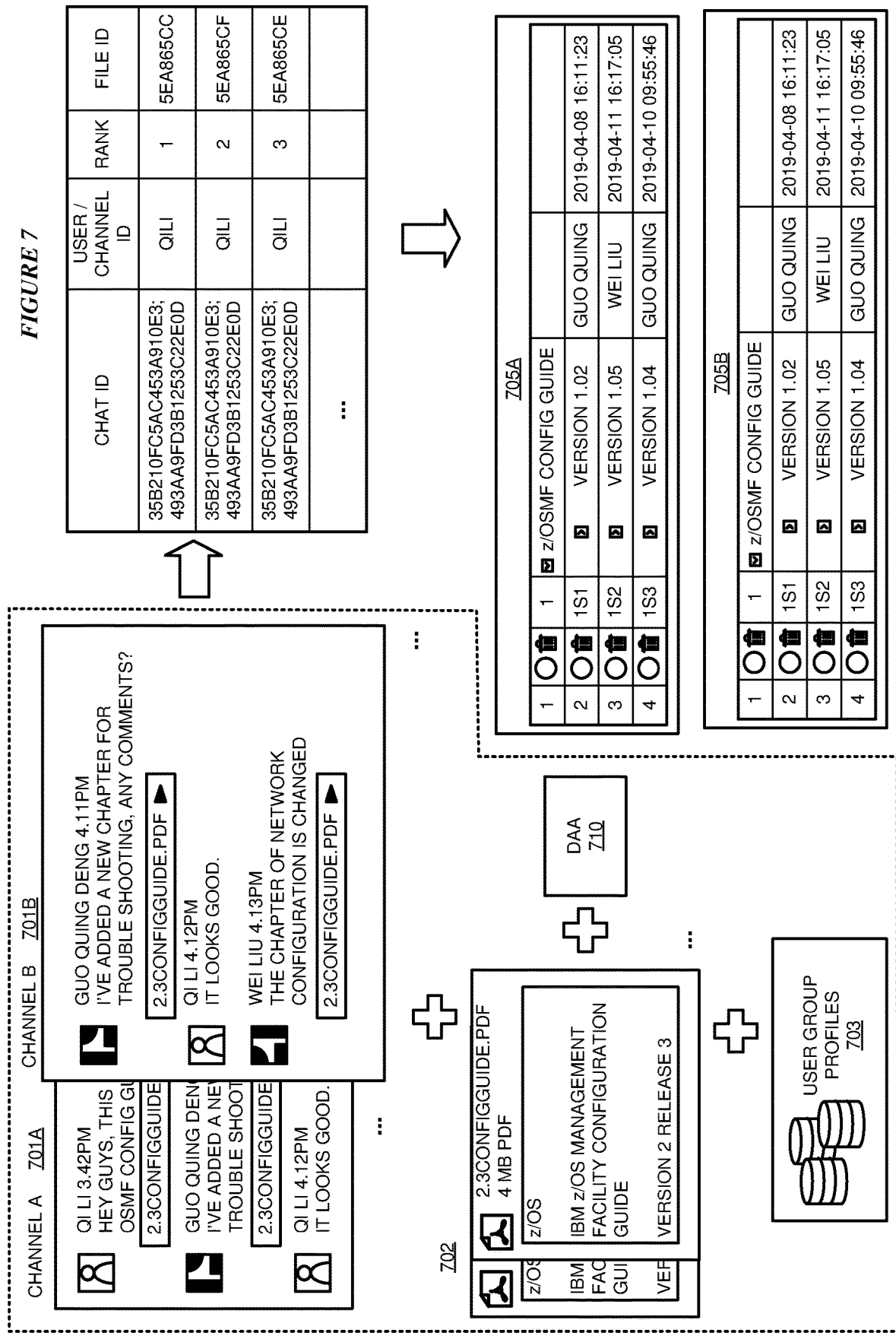
FIG. 7 depicts an illustrative embodiment of output generated in accordance with a discourse attachment arrangement component providing a hierarchically ordered arrangement of discourse attachments including multiple file versions across multiple domain channels.

FIG. 7 depicts an illustrative embodiment of output generated in accordance with a discourse attachment arrangement component providing a hierarchically ordered arrangement of discourse attachments including multiple file versions across multiple channel domains 701A, 701B. The DAA component 710 can be used to arrange attachments in the same chat group, but can also be leveraged to arrange the attachments across the multiple channel domains 710A, 701B. The chat history from multiple channel domains are collected and analysed in conjunction with file attachments 702 and user profiles 703. The derived DAA component 710 can be used to arrange attachments 705A, 705B for file attachments shared across multiple channel domains 701A, 701B respectively.

Figure 8:
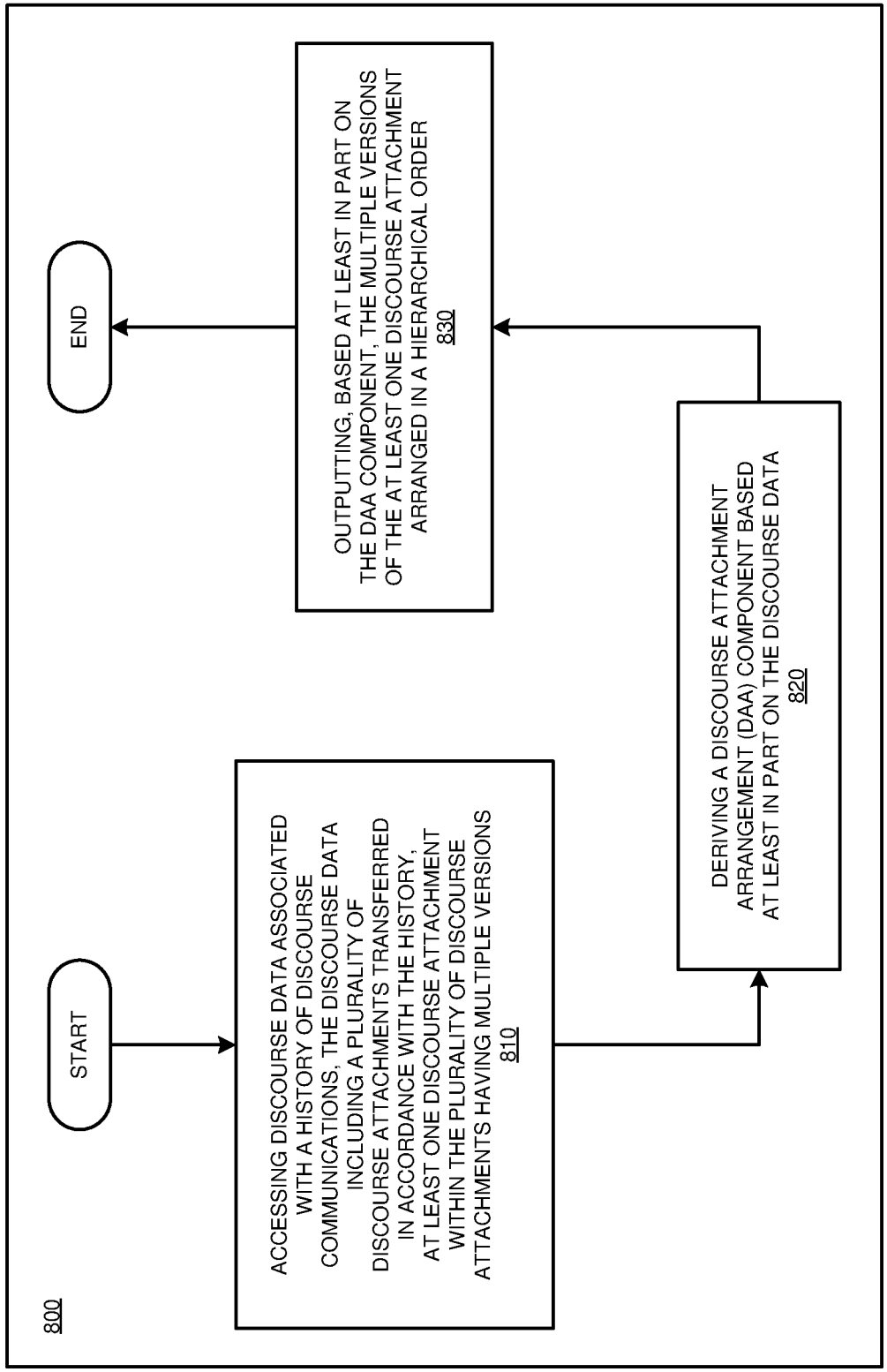
FIG. 8 depicts a flowchart of an example process for a discourse attachment arrangement providing a hierarchically ordered arrangement of discourse attachments.

FIG. 8 depicts a flowchart of an example process 800 for a discourse attachment arrangement providing a hierarchically ordered arrangement of discourse attachments.

At block 810, accessing discourse data associated with a history of discourse communications. The discourse data includes a plurality of discourse file attachments transferred in accordance with the history. At least one discourse attachment within the plurality of discourse attachments is includes or is associated with multiple versions pertaining to the file attachments.

At block 820, deriving a discourse attachment arrangement (DAA) component 610, 710 based at least in part on the discourse data.

At block 830, outputting, based at least in part on the DAA component, the multiple versions of the at least one discourse attachment arranged in a hierarchical order.

Figure 9:
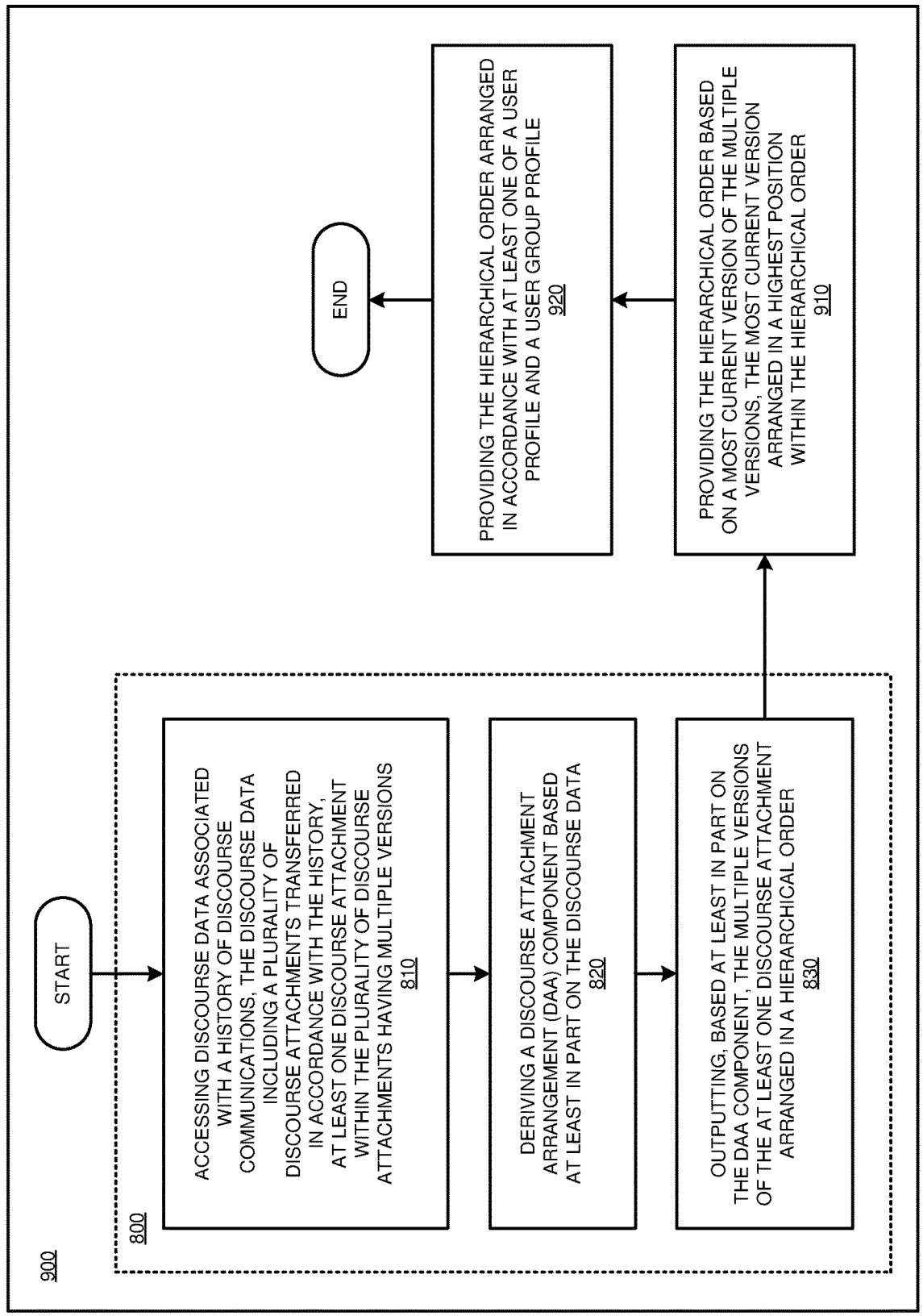
FIG. 9 depicts a flowchart of another example process for a discourse attachment arrangement.

FIG. 9 depicts a flowchart of another example process for a discourse attachment arrangement. Process 900 can be implemented in DAA application 305 in conjunction with process 800 as depicted in FIG. 8.

At block 910, providing the hierarchical order based on a most current version of the multiple versions. The most current version is arranged in a highest position within the hierarchical order in one embodiment.

At block 920, the hierarchical order is arranged in accordance with the given user profile or user group profile, in one variation.

Thus, a computer implemented method, system or apparatus, and computer program product are provided in the illustrative embodiments for arranging, in an ordered hierarchy, attached files as transferred during a discourse history, among other embodiments disclosed. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   accessing discourse data associated with a history of discourse communications, the discourse data including a plurality of discourse attachments transferred in accordance with the history, at least one discourse attachment within the plurality of discourse attachments having multiple versions;
   deriving, using an artificial neural network and the plurality of discourse attachments, a discourse attachment arrangement (DAA) component based at least in part on the discourse data; and
   outputting, based at least in part on the DAA component, the multiple versions of the at least one discourse attachment arranged in a hierarchical order.

2. The computer-implemented method of claim 1 wherein the discourse data further includes one of a plurality of user profiles and a plurality of user group profiles.

3. The computer-implemented method of claim 1 wherein deriving the DAA component further comprises:
   providing the plurality of discourse attachments to a corresponding plurality of input layers of the artificial neural network (ANN), the ANN implemented in a processor, the plurality of input layers being interconnected with an output layer of the ANN via a set of middle layers.

4. The computer-implemented method of claim 3 wherein the DAA component is provided as a function of the output layer, the DAA component specifying the hierarchical order of the multiple versions of the at least one discourse attachment.

5. The computer implemented method of claim 4 further comprising providing the hierarchical order based on a most current version of the multiple versions, the most current version arranged in a highest position within the hierarchical order.

6. The computer implemented method of claim 5 further comprising providing the hierarchical order arranged in accordance with at least one of a user profile and a user group profile.

7. The computer implemented method of claim 1 wherein the discourse data is associated with a first discourse channel domain of a multiplicity of discourse channel domains, and further comprising discourse data associated with at least a second discourse channel domain.

8. The computer-implemented method of claim 7 further comprising outputting, based at least in part on the DAA component, multiple versions of attachments that are shared across the first and the at least a second discourse channel domains in a first and an at least a second hierarchical orders.

9. A computer usable program product comprising one or more computer-readable storage media, and program instructions stored on at least one of the one or more storage media, the program instructions when executed in one or more processors causing operations comprising:
   accessing discourse data associated with a history of discourse communications, the discourse data including a plurality of discourse attachments transferred in accordance with the history, at least one discourse attachment within the plurality of discourse attachments having multiple versions;
   deriving, using an artificial neural network and the plurality of discourse attachments, a discourse attachment arrangement (DAA) component based at least in part on the discourse data; and
   outputting, based at least in part on the DAA component, the multiple versions of the at least one discourse attachment arranged in a hierarchical order.

10. The computer usable program product of claim 9 wherein the discourse data further includes one of a plurality of user profiles and a plurality of user group profiles.

11. The computer usable program product of claim 9, the program instructions when executed in the one or more processors causing operations further comprising:
    providing the plurality of discourse attachments to a corresponding plurality of input layers of the artificial neural network (ANN), the ANN implemented in the one or more processors, the plurality of input layers being interconnected with an output layer of the ANN via a set of middle layers.

12. The computer usable program product of claim 11 wherein the DAA component is provided as a function of the output layer, the DAA component specifying the hierarchical order of the multiple versions of the at least one discourse attachment.

13. The computer usable program product of claim 12, the program instructions when executed in the one or more processors causing operations further comprising:
    providing the hierarchical order based on a most current version of the multiple versions, the most current version arranged in a highest position within the hierarchical order.

14. The computer usable program product of claim 13, the program instructions when executed in the one or more processors causing operations further comprising:
    providing the hierarchical order arranged in accordance with at least one of a user profile and a user group profile.

15. The computer usable program product of claim 9 wherein the discourse data is associated with a first discourse channel domain of a multiplicity of discourse channel domains, and further comprising discourse data associated with at least a second discourse channel domain.

16. The computer usable program product of claim 15, the program instructions when executed in the one or more processors causing operations further comprising outputting, based at least in part on the DAA component, multiple versions of attachments that are shared across the first and the at least a second discourse channel domains in a first and an at least a second hierarchical orders.

17. A computer system comprising one or more processors, one or more computer-readable memories, and one or more computer-readable storage media, and program instructions stored on at least one of the one or more storage media for execution by at least one of the one or more processors via at least one of the one or more memories, the program instructions when executed in the one or more processors causing operations comprising:
    accessing discourse data associated with a history of discourse communications, the discourse data including a plurality of discourse attachments transferred in accordance with the history, at least one discourse attachment within the plurality of discourse attachments having multiple versions;

deriving, using an artificial neural network and the plurality of discourse attachments, a discourse attachment arrangement (DAA) component based at least in part on the discourse data; and outputting, based at least in part on the DAA component, the multiple versions of the at least one discourse attachment arranged in a hierarchical order.

18. The computer system of claim 17 wherein the discourse data is associated with a first discourse channel domain of a multiplicity of discourse channel domains, and further comprising discourse data associated with at least a second discourse channel domain.

19. The computer system of claim 18, the program instructions when executed in the one or more processors causing operations further comprising outputting, based at least in part on the DAA component, multiple versions of attachments that are shared across the first and the at least a second discourse channel domains in a first and an at least a second hierarchical orders.

20. The computer system of claim 17 the program instructions for deriving the DAA component when executed in the one or more processors causing operations further comprising:

providing the plurality of discourse attachments to a corresponding plurality of input layers of the artificial neural network (ANN), the ANN implemented in a processor, the plurality of input layers being interconnected with an output layer of the ANN via a set of middle layers.

* * * * *